United States Patent [19]
Kondo et al.

[11] 3,769,170
[45] Oct. 30, 1973

[54] METHOD OF PRODUCING COENZYME Q10 BY MICROORGANISMS

[75] Inventors: Keji Kondo; Yuzo Yamada, both of Shizuoka-ken; Koji Mitzugi; Shin-Ichiro Otsuka, both of Kanagawa-ken, all of Japan

[73] Assignee: Ajinomoto Co., Inc., Tokyo, Japan

[22] Filed: Mar. 8, 1971

[21] Appl. No.: 122,226

[30] Foreign Application Priority Data
Mar. 31, 1970 Japan.............................. 45/27329
Aug. 24, 1970 Japan.............................. 45/74012

[52] U.S. Cl. .................................................. 195/82
[51] Int. Cl............................................. C12c 11/00

[58] Field of Search...................... 195/82, 96, 28 R, 195/29, 62

[56] References Cited
UNITED STATES PATENTS
3,658,648 4/1972 Nakao et al...................... 195/28 R
3,066,080 11/1962 Folkers et al........................ 195/96

*Primary Examiner*—A. Louis Monacell
*Assistant Examiner*—R. B. Penland
*Attorney*—Kelman & Berman

[57] ABSTRACT

Certain yeasts and bacteria produce a large amount of intracellular coenzyme $Q_{10}$ which is useful as medicine.

3 Claims, No Drawings

METHOD OF PRODUCING COENZYME Q10 BY MICROORGANISMS

The present invention relates to a method of producing coenzyme $Q_{10}$.

Coenzyme Q is one of the compounds having the general formula

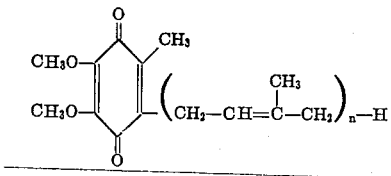

and is the compound in which n is 10.

Coenzyme $Q_{10}$ can be widely found in animal and plant tissue, and is known to be an essential compound in a terminal electron transport system. The pharmaceutical and physiological effect of coenzyme $Q_{10}$ in various diseases has recently been found.

Coenzyme $Q_{10}$ has been commercially produced by extracting animal tissues, however, this is very expensive. It is known that coenzyme $Q_{10}$ is present in the cells of bacteria, such as Pseudomonas denitrificans and Agrobacterium tumefaciens, and moulds, such as Neurospora crassa and Aspergillus fumigatus, in very small amounts.

It has now been found that coenzyme $Q_{10}$ can be produced in large amounts in microbial cells of the genera Rhodotorula, Cryptococcus, Sporobolomyces, Candida, Torulopsis, Rhodosporidium, Trichosporon, Aureobasidium, Tremella, Bullera which are yeasts of the bacterium Alcaligenes, when they are cultured on a nutrient medium, and that the coenzyme $Q_{10}$ can be easily recovered from the cells.

Microorganisms able to produce coenzyme $Q_{10}$ include

Rhodotorula flava IFO 1193
Rhodotorula glutinis IFO 667
Rhodotorula rubra FERM P-632
Rhodotorula peneaus IFO 930
Rhodotorula pallida IFO 715
Rhodotorula marina IFO 879
Rhodotorula texensis IFO 932
Cryptococcus neoformans FERM P-631
Cryptococcus albidus IFO 610
Cryptococcus laurentii IFO 609
Cryptococcus tereus IFO 727
Cryptococcus luteolus IFO 611
Sporobolomyces roseus IFO 1031
Sporobolomyces pararoseus IFO 1103
Sporobolomyces salmonicolor IFO 374
Sporobolomyces gracilis FERM P-633
Candida curvata ATCC 10567
Candida curvata FERM P-633
Candida japonica FERM P-662
Candida bogoriensis FERM P-666
Candida marina FERM P-854
Torulopsis ingeniosa FERM P-665
Torulopsis capsuligenes FERM P-667
Torulopsis aeria FERM P-664
Trichosporon byrdii FERM P-851
Trichosporon cutaneum FERM P-850
Rhodosporidium sphaerocarpum FERM P-856
Rhodosporidium dibovatum FERM P-857
Aureobasidium pullulans FERM P-852
Tremella fuciformis FERM P-853
Bullera alba FERM P-855
Alcaligenes faecalis FERM P-849

The microorganisms which can produce coenzyme $Q_{10}$ are cultured on a nutrient medium containing as assimilable carbon source, an assimilable nitrogen source, inorganic salts and organic nutrients. Suitable assimilable carbon sources are carbohydrates, such as glucose or starch hydrolyzate, organic acids, such as acetic acid, fumaric acid, maleic acid or lactic acid, alcohols, such as ethanol or propanol and gaseous or liquid hydrocarbons. Suitable assimilable nitrogen sources are organic or inorganic componds, such as amino acids, polypeptone, soybean protein extracts, soybean whey, urea, ammonium sulfate, ammonium chloride, ammonium phosphate, aqueous and gaseous ammonia. Minor amounts of organic compounds, such as yeast extract, meat extracts, malt extract, corn steep liquor and vitamins should be present.

The microorganisms are cultured at pH 2 to 8, at 20 to 37°C. for 10 to 50 hours under aerobic conditions. When the pH of the medium changes sufficiently during the cultivation that the microbial growth is inhibited, the pH is adjusted by adding an acidic or alkaline compound.

Microbial cells grown in the culture broth can be recovered by centrifuging or filtration. As the microbial cells contain a large amount of coenzyme $Q_{10}$, the cells can be used as nutrients and medicines. Coenzyme $Q_{10}$ may also be isolated from the cells by conventional methods. For example, the microbial cells may be heated under reflux conditions at 80° to 90°C. for about one hour in a mixture of aliphatic lower alcohol, sodium hydroxide and pyrogallol. To coenzyme $Q_{10}$ liberated is extracted by a solvent, such as n-hexane or light oil, and solids are removed by filtration. The solvent fraction is concentrated and purified by means of silicagel.

Coenzyme $Q_{10}$ so obtained was identified by paper chromatography, thin layer chromatography, elementary analysis, melting point, infrared and ultraviolet absorption spectra and mass spectrometry.

The amount of coenzyme $Q_{10}$ produced was determined by Folker's method (Archives of Biochemistry and Biophysics, volume 87, page 298, 1960).

EXAMPLE 1

A culture medium containing 5 g/dl glucose, 0.5 g/dl polypeptone and 0.2 g/dl yeast extract, of pH 6.0 was prepared, and one litre batches of the medium were placed in 5 litre Erlenmeyer flasks and sterilized at 120°C for 10 minutes. Each medium was inoculated with 50 ml seed culture of Rhodotorula rubra FERM P-632 which had previously been cultured at 25°C for 20 hours on the same medium and cultured at 25°C for 30 hours with shaking. Ten litres of the culture broth were centrifuged, the microbial cells obtained were washed with water, and centrifuged again. 125 Grams living cells were suspended in 120 ml water, 240 ml methanol, 12 g pyrogallol, 64 g NaOH and 80 ml water were added to the cell suspension, and the mixture was heated to reflux at 80°C for one hour. After cooling, the the heated mixture was centrifuged to remove the cells, 320 ml n-hexane was added to the supernatant, and coenzyme $Q_{10}$ was extracted. Extraction with n-hexane was repeated 3 times, and the n-hexane layers were collected, and washed 3 times with 100 ml water. The extract was dried with 50 g anhydrous sodium sulfate, evaporated to dryness under reduced pressure, and the residues were dissolved in 40 ml acetone. The acetone was evaporated, and the residue was dissolved in 5 ml acetone and passed through a column packed with 200 ml silicagel. Benzene was passed over the column, fractions which contained carotenoid pigment were eluted in the range of the 380 ml fraction, and 150 ml yellow fractions were obtained after the carotenoid fractions were collected. The yellow fractions were evaporated in a vacuum, and the residue was dissolved in 5 ml ethanol. When cooled for two days in an icebox, the solution yielded yellow crystals which were collected by filtration and recrystallized twice from ethanol, and 2.7 mg yellow crystals of coenzyme $Q_{10}$ were obtained.

The Rf value on a paper chromatogram of the crystal was identical that of authentic coenzyme $Q_{10}$, the crystal melted at 48.5°C., a maximum absorption band was found at 275 m$\mu$ in an ultraviolet absorption spectrum of their ethanol solution and $E_{1\ cm}^{1\%}$ was 165 at 275 m$\mu$. A parent peak (a molecular ion peak) was found at m/1 862 by spectrophotometry of an acetone solution. These properties of the crystals were identical which those of authentic coenzyme $Q_{10}$.

EXAMPLE 2

Sporobolomyces roseus IFO 1031 was cultured on a medium containing 5 g/dl glucose, 1 g/dl polypeptone, 1 ml/dl soybean protein hydrolyzate and 1 ml/dl corn steep liquor, of pH 6.0 as in Example 1, and 160 g living cells were obtained from 10 litres culture broth. The cells were treated in the same manner as in Example 1, and 3.5 mg pure crystalline coenzyme $Q_{10}$ was obtained.

EXAMPLE 3

A culture medium containing 1 g/dl glucose, 0.2 g/dl yeast extract and 0.3 g/dl polypeptone, of pH 6.0 was prepared, 50 ml batches of the medium were placed in 500 ml shaking flask, and yeasts as indicated in the following Table 1 were cultured at 26° – 27°C. for 36 hours with shaking. Living cells were collected by centrifugation, and coenzyme $Q_{10}$ was determined as follows:

20 To 30 g of living cells were suspended in 30 ml water. 80 Ml methanol, 3 g pyrogallol, 16 g NaOH and 20 ml water were added to the suspension, and the mixture was heated to reflux on a water bath at 80° to 90°C and thereafter left to stand at room temperature for 30 minutes. Coenzyme $Q_{10}$ was extracted with 80 ml n-hexane three times, and the combined n-hexane solution was washed with water and dried with anhydrous sodium sulfate. The n-hexane was evaporated under a reduced pressure, and the residue was dissolved in 10 ml acetone. After filtration, the acetone solution was evaporated in a vacuum, and the residue obtained was dissolved in a small amount of acetone. The solution was spotted on a silica gel thin layer, which was developed with benzene, whereby coenzyme $Q_{10}$ was separated from carotenoid compounds. A coenzyme $Q_n$ fraction was cut out, dissolved in acetone, and analyzed by paper chromatography. The acetone solution was spotted on a filter paper which had previously been treated with 3% (w/v) silicon KF-54 (Trade Mark, manufactured by Shin-Etsu Chemical Industry Co., Ltd.)-chloroform solution, and developed by the following solvents, together with authentic samples of coenzyme $Q_6$ to $Q_{10}$.

Solvent A=ethanol: ethyl acetate: water= 5:3:1 (parts by volume)

Solvent B=n-propanol: water= 4:1 (parts by volume)

Solvent C=Acetone: water=5:1 (parts by volume)

Each sample was also spotted on a filter paper which had been treated with 2.5% (w/v) colorless vaseline-toluene solution, and developed by a solvent D (N,N-dimethylformamide : water = 97:3, parts by volume).

The Rf values of the authentic samples were as follows:

| Coenzyme $Q_n$ | Rf value: Solvent A | Solvent B | Solvent C | Solvent D |
|---|---|---|---|---|
| n=6 | 0.82 | 0.80 | 0.34 | 0.81 |
| n=7 | 0.74 | 0.73 | 0.24 | 0.70 |
| n=8 | 0.65 | 0.67 | 0.16 | 0.58 |
| n=9 | 0.56 | 0.60 | 0.10 | 0.45 |
| n=10 | 0.46 | 0.53 | 0.06 | 0.29 |

The Rf values of the end product of the present invention were identical with those of the authentic coenzyme $Q_{10}$.

The amount of the coenzyme $Q_{10}$ produced was determined by Folker's method. That is, the acetone extract obtained from the thin layer chromatogram was dissolved in 10 ml ethanol, 4 ml of the ethanol solution were mixed with 1 ml ethylcyanoacetate and 1 ml 0.2N—KOH solution, and 8 minutes later the light absorbancy was measured at 625 m$\mu$ by means of a spectrophotometer. On the other hand, a standard light absorbancy value was determined for a mixture of 4 ml ethanol, and 1 ml ethanol and 1 ml 0.2N—KOH solution in the same way as for the tested sample. The light absorbancy of the authentic sample was deducted from that of the tested sample, and the amount of coenzyme $Q_{10}$ was determined from a standard curve which had been prepared with authentic coenzyme $Q_{10}$.

TABLE 1

| Strain | Amount of coenzyme $Q_{10}$ produced mg/g of dried cells |
|---|---|
| Rhodotorula flava IFO 1193 | 0.25 |
| " glutinus IFO 667 | 0.21 |
| " peneaus IFO 930 | 0.22 |
| " pallida IFO 715 | 0.24 |
| " marina IFO 879 | 0.21 |
| " rubra FERM P-632 | 0.32 |
| " texensis IFO 932 | 0.19 |
| Cryptococcus neoformans FERM P631 | 0.35 |
| " albidus IFO 610 | 0.23 |
| " Laurentii IFO 609 | 0.20 |
| " tereus IFO 727 | 0.19 |
| " luteolus IFO 611 | 0.15 |
| Sporobolomyces reseus IFO 1031 | 0.36 |
| " pararoseus IFO 1103 | 0.34 |
| " salmonicolor IFO 374 | 0.35 |
| " gracilis FERM P-633 | 0.31 |

EXAMPLE 4

5 L of a culture medium containing 5 g/dl glucose, 0.3 g/dl polypeptone and 0.3 g/dl yeast extract, of pH 5.5 was inoculated with Candida curvata ATCC 10567, and cultured at 30°C for 24 hours with stirring at 300 r.p.m. while 3 litres air were introduced per minute. During the cultivation, the pH of the medium was adjusted to 5.5 by adding gaseous ammonia and sulfuric acid.

From the culture broth, a living cell paste 78 g dry cell solids and which contained 370 micrograms coenzyme $Q_{10}$ per gram of dried cells was obtained by centrifugation.

The cells were treated as in Example 1, but coenzyme $Q_{10}$ was extracted from the silica gel with isooctane instead of benzene, and 18.6 mg pure, yellow, crystalline coenzyme $Q_{10}$ was obtained.

EXAMPLE 5

*Candida curvata* FERM P-632 was cultured in the same way as in Example 4, and 68 g dried cells were obtained. One gram of the dried cells was found to contain 32 µg coenzyme $Q_{10}$, and 15.0 mg pure coenzyme $Q_{10}$ was obtained.

EXAMPLE 6

The strains as indicated in the following Table 2 were cultured as in Example 4, and the results listed in Table 2 were obtained.

TABLE 2

| Strain used | Living cell paste as dried cells (g) | Coenzyme $Q_{10}$ in dried cell (µg/g) | Coenzyme $Q_{10}$ (Mg) |
|---|---|---|---|
| Candida marina FERM P-854 | 4.05 | 480 | 15.5 |
| Candida japonica FERM P-662 | 36.5 | 400 | 14.6 |
| Candida bogoriensis FERM P-666 | 60 | 300 | 9.0 |
| Torulopsis ingeniosa FERM P-665 | 105 | 450 | 47 |
| Torulopsis capsuligenes FERM P-667 | 65 | 260 | 16.9 |
| Torulopsis aeria FERM P-664 | 80 | 300 | 16.3 |

EXAMPLE 7

Trichosporon byrdii FERM P-851 was inoculated on a 5 l medium containing 5 g/dl glucose, 0.5 g/dl malt extract, 0.5 g/dl yeast extract and 0.2 g/dl ammonium sulfate, of pH 5.5, and cultured at 30°C for 26 hours in the same way as in Example 4, and 74.5 g living cell paste (as dry matter) was obtained. The cells were found to contain 330 micrograms coenzyme $Q_{10}$ per gram of dry cell solids.

The cells were worked up as in Example 4, and 17.1 mg pure crystalline coenzyme $Q_{10}$ was obtained.

EXAMPLE 8

Alcaligenes faecalis FERM P-849 was inoculated on 5 liters of a medium containing 5 g/dl glucose, 1 g/dl polypeptone, 0.2 g/dl yeast extract and 0.5 g/dl meat extract, of pH 7.0, and cultured at 30°C for 28 hours in the same way as in Example 4.

From the culture broth, 48.0 g living cells (as dry matter) were obtained, and the cells were found to contain 450 micrograms coenzyme $Q_{10}$ per gram of dried cells.

The cells were treated in the same way as in Example 1, and 15.4 mg pure coenzyme $Q_{10}$ was obtained.

EXAMPLE 9

The yeasts indicated in Table 3 were cultured in the same way as in Example 4, and the living cells obtained (as dried cells), the coenzyme $Q_{10}$ content of the cells, and the amount of pure crystalline coenzyme $Q_{10}$ obtained are listed in the following Table 3.

TABLE 3

| Strain used | Living cell (g) | Coenzyme $Q_{10}$ Content (µg/g) | Crystalline Coenzyme $Q_{10}$ mg |
|---|---|---|---|
| Rhodosporidium sphaerocarpum FERM P-856 | 60.0 | 120 | 5.7 |
| Rhodosporidium dibovatum FERM P-857 | 69.1 | 60 | 3.5 |
| Trichosporon cutaneum FERM P-850 | 86.5 | 310 | 19.1 |
| Tremella fuciformis FERM P-853 | 82.8 | 145 | 8.1 |
| Aureobasidium pullulans FERM P-852 | 53.8 | 75 | 3.1 |
| Bullera alba FERM P-855 | 44.2 | 135 | 4.1 |

What we claim is:

1. A method of producing coenzyme $Q_{10}$ which comprises culturing a microorganism selected from the group consisting of *Rhodotorula flava* IFO 1193, *Rhodotorula glutinis* IFO 667, *Rhodotorula rubra* FERM P-632, *Rhodotorula peneaus* IFO 930, *Rhodotorula pallida* IFO 715, *Rhodotorula marina* IFO 879, *Rhodotorula texensis* IFO 932, *Cryptococcus neoformans* FERM P-633, *Cryptococcus albidus* IFO 610, *Cryptococcus laurentii* IFO 609, *Cryptococcus terreus* IFO 727, *Cryptococcus luteolus* IFO 611, *Sporobolomyces roseus* IFO 1031, *Sporobolomyces pararoseus* IFO 1103, *Sporobolomyces salmonicolor* IFO 374, *Sporobolomyces gracilis* FERM P-633, *Candida curvata* ATCC 10567, *Candida curvata* FERM P-663, *Candida japonica* FERM P-662, *Candida bogoriensis* FERM P-666, *Candida marina* FERM P-854, *Torulopsis ingeniosa* FERM P-665, *Torulopsis capsuligenes* FERM P-667, *Torulopsis aeria* FERM P-664, *Rhodosporidium sphaerocarpum* FERM P-856, *Trichosporon byrdii* FERM P-851, *Trichosporon cutaneum* FERM P-850, *Aureobasidium pullulans* FERM P-852, *Bullera alba* FERM P-855, and *Rhodosporidium dibovatum* FERM P-857 on a nutrient medium containing sources of assimilable carbon and nitrogen, inorganic salts, and organic nutrients until intracellular coenzyme $Q_{10}$ is produced in said microorganism.

2. A method as set forth in claim 1, wherein said coenzyme $Q_{10}$ is recovered.

3. A method as set forth in claim 1, wherein said coenzyme $Q_{10}$ is recovered in the form of crystals.

* * * * *